(12) United States Patent
Lalonde

(10) Patent No.: US 7,236,676 B2
(45) Date of Patent: Jun. 26, 2007

(54) HIGH FREQUENCY TEST FIXTURE

(75) Inventor: André Lalonde, Allen, TX (US)

(73) Assignee: Finisar Corporation, Sunnyvale, CA (US)

( * ) Notice: Subject to any disclaimer, the term of this patent is extended or adjusted under 35 U.S.C. 154(b) by 74 days.

(21) Appl. No.: 11/103,983

(22) Filed: Apr. 12, 2005

(65) Prior Publication Data

US 2006/0228085 A1    Oct. 12, 2006

(51) Int. Cl.
*G02B 6/00*    (2006.01)
(52) U.S. Cl. ............... 385/134; 385/135; 385/136; 385/137
(58) Field of Classification Search ......... 385/134–137
See application file for complete search history.

(56) References Cited

U.S. PATENT DOCUMENTS

2006/0045409 A1*    3/2006    Tatum et al. ................. 385/12

\* cited by examiner

*Primary Examiner*—Jennifer Doan
(74) *Attorney, Agent, or Firm*—Workman Nydegger

(57) ABSTRACT

An apparatus for testing optical components. The apparatus includes a component cavity. The component cavity includes a package portion generally including fit tolerances but otherwise including a similar size and shape of an optical component to be tested. The component cavity further includes an electrical interface portion that can hold electrical interface leads of the optical component. The apparatus further includes an optical fiber interface optically connected to the cavity. The optical fiber interface mates with an optical fiber. The optical fiber is connected optically to the optical component being tested.

18 Claims, 2 Drawing Sheets

HIGH FREQUENCY TEST FIXTURE

BACKGROUND OF THE INVENTION

1. The Field of the Invention

The invention is directed to test fixtures. More specifically, the invention is directed to test fixtures for use in testing optical components.

2. Description of the Related Art

Modern computing involves the transmission of large amounts of data on networks formed of two or more computers. As the processing power of computers has increased, there has been a need to keep pace with increased data handling capability across networks. One technology that facilitates the transmission of large amounts of data on the network is fiber-optics. Fiber-optics use light signals transmitted across glass or plastic fibers to communicate data. Fiber optic networks are able to transmit data at faster rates than conventional copper wire based networks. Additionally, fiber optic networks are less susceptible to noise and intrusion.

To transmit data on a fiber-optic network a light generating device is needed. Commonly, light generating devices include a laser diode or light emitting diode (LED). The light generating devices are often packaged in a TO can. The TO can has a lens in the top of the can for allowing light to be transmitted out of the can.

The TO can further includes an electrical interface such as pins or flexible circuit board traces accessible external to the TO can. The flexible circuit board trace may be soldered to other components in a system.

To receive the data on the fiber-optic and network, a device that converts light signals to electrical signals is needed. Commonly, a photodiode connected to a transimpedance amplifier is used to convert the optical signals to electrical signals. The photodiode and transimpedance amplifier are often, like the light generating devices, enclosed in a TO can.

As a part of the production process of fiber optic components, the fiber optic components often undergo testing. The testing may be for example, testing to determine functionality, performance, and ratings. Testing should be repeatable for components. For example, testing should allow components to exhibit the same characteristics when tested under the same conditions.

To test the fiber optic components, the fiber optic components are connected in conditions similar to what they would be installed in for a various applications. However, to prevent damage to the fiber optic components, they may be installed for testing using a test board that allows the fiber optic component to be connected without damaging connections on the fiber optic component. For example, it may not be desirable to solder the flexible circuit board traces as would be done in a final installation because repeated soldering and desoldering may be harmful to the fiber optic component.

One test board uses a plate that compresses the flexible circuit board traces against pins that make electrical contact to the traces. The plate is compressed onto the flexible circuit board by tightening fasteners, such as screws, against the plate. A fiber optic cable may be attached to the receptacle. In this way, various electrical or optical signals can be delivered to the fiber optic component for testing while resultant optical or electrical signals are measured.

One drawback of the test board described above relates to repeatability in testing. This is due to differences in the testing that may occur due to the flexible circuit board being in different positions in different tests. Additionally, the flexible circuit boards allow some freedom of movement of a TO can under test. Thus, a shift in the fiber optic cable connected to the TO can may cause a change in test measurements. Further, the test apparatus described above may be time consuming to use. To prepare each component for test may require a significant amount of time, including mounting and positioning the component for testing. There is therefore a need for test apparatus that allow for consistent test conditions while avoiding damage to the component under test. Further, a test apparatus that allows for quickly changing out devices under test would be useful.

BRIEF SUMMARY OF THE INVENTION

One embodiment includes an apparatus for testing optical components. The apparatus includes a component cavity. The component cavity includes a package portion generally including fit tolerances but otherwise including a similar size and shape of an optical component to be tested. The component cavity further includes an electrical interface portion that can hold electrical interface leads of the optical component. The apparatus further includes an optical fiber interface optically connected to the cavity. The optical fiber interface mates with an optical fiber. The optical fiber is connected optically to the optical component being tested.

Another embodiment includes a method of manufacturing a test fixture for testing optical components. The method includes forming a component cavity. The act of forming the component cavity includes forming a package portion that includes fit tolerances but is otherwise similar in size and shape to an optical component to be tested. Forming a component cavity further includes forming an electrical interface portion that receives electrical interface leads of the optical component. The method further includes forming an optical fiber interface connected to the cavity. The optical fiber interface is configured to mate with an optical fiber and to optically connect the optical fiber to the optical component being tested.

Another embodiment includes a method of testing optical components. The method includes placing the optical component into a package portion of a component cavity. The package portion generally including fit tolerances but otherwise includes a similar size and shape of the optical component. The method further includes placing leads coupled to the package in an electrical interface portion of the component cavity. The optical component is secured using a latch mechanism. A fiber-optic cable including a connector is connected to a receptacle mating with the connector such that the fiber-optic cable is optically coupled to the optical component.

Advantageously, the embodiments described above allow for repeatable testing to be performed. By allowing optical components and their leads to be consistently secured in a similar fashion each time, testing is highly repeatable and predictable. This results in less errors in testing optical components.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Embodiments disclosed herein include a test fixture that allows optical components to be positioned consistently in the test fixture. The test fixture further includes an optical fiber connector receptacle, such as an LC or SC receptacle, which allows an optical fiber to be optically coupled to the optical component under test. The test fixture allows for consistent positioning and alignment of optical fibers and optical components which translates into consistent test results.

As mentioned previously, the test fixture may be optimized with various types of receptacles depending on the type of component or fiber used for testing. For example, the receptacle may be an LC type connector. Alternatively, the receptacle may be an SC type receptacle. While not enumerated here, other receptacle types may be used.

Further, the test fixture may be designed to operate various types of optical devices. For example, the test fixture may include pogo pins for contacting traces on a flexible circuit board, where the flexible circuit board supplies various electrical interface connections to the optical component. For example, the optical component may include a TO can housing that includes a flexible circuit board interface.

Figure 1:
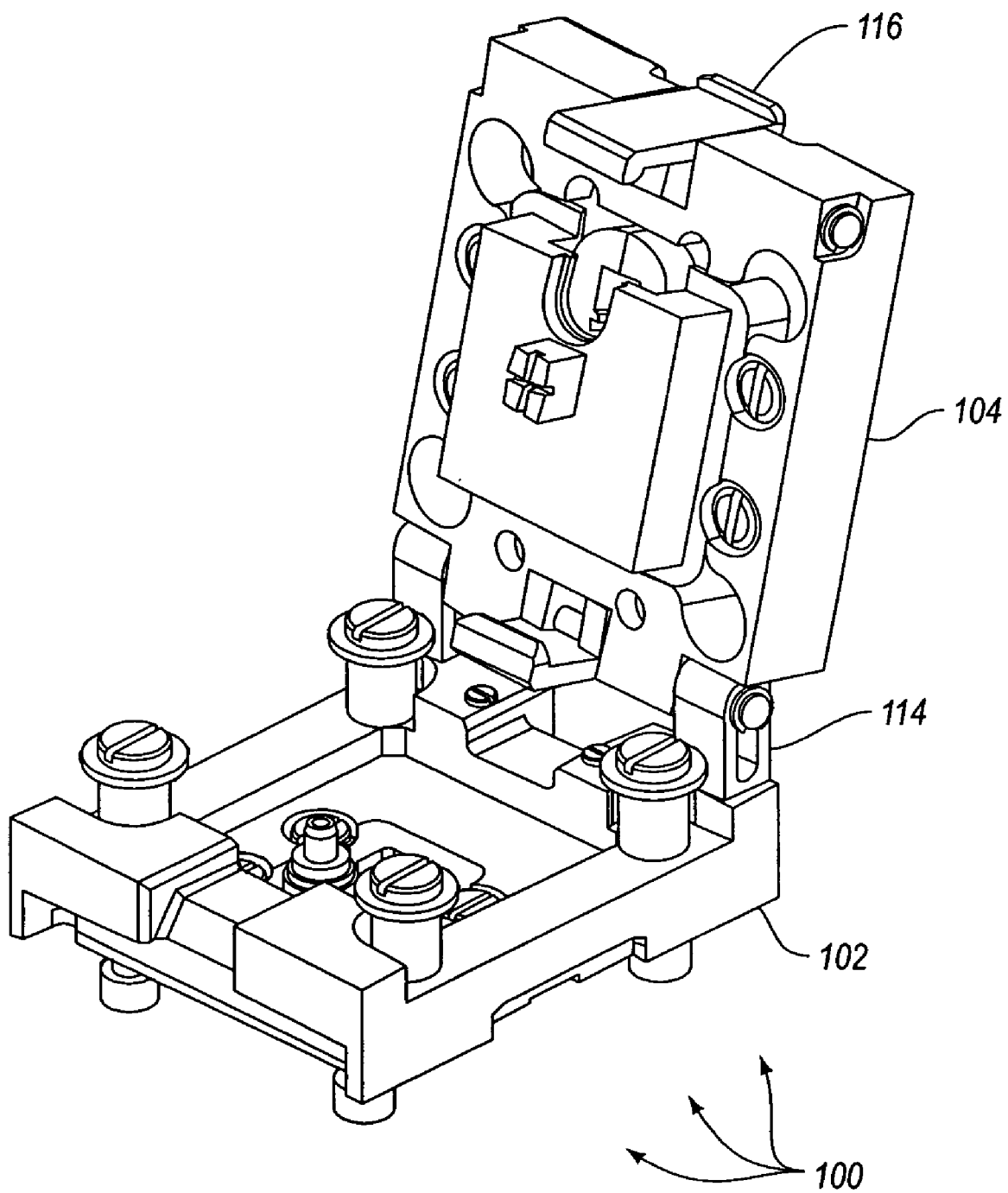
FIG. 1 illustrates a clam-shell high frequency test fixture.
Figure 2:
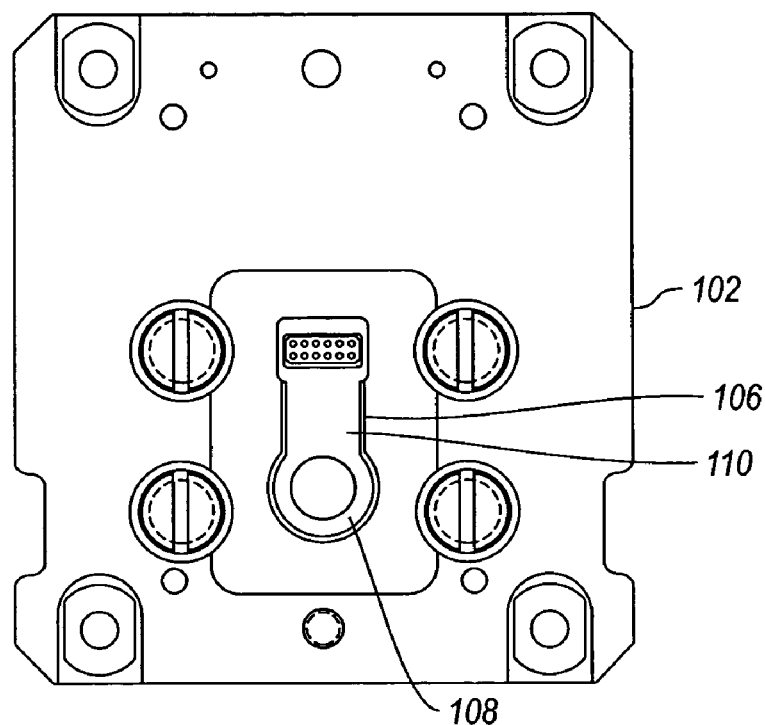
FIG. 2 illustrates the base of the test fixture.

Referring now to FIG. 1, one embodiment is illustrated. A test fixture 100 is shown. The test fixture 100 includes a base socket 102 and a lid 104. As shown in FIG. 2, the base socket 102 includes a component cavity 106 where an optical component can be placed for test. The component cavity 106, in this example, is shaped to include a package portion 108 and an electrical interface portion 110. The package portion 108, in this example, is shaped so as to provide a close fit for a TO can type package. Stated differently, the package portion generally includes fit tolerances but otherwise is a similar size and shape of an optical component to be tested. In this example, the size and shape is that of a TO can package. The electrical interface portion 110 is shaped so as to provide an area where an electrical interface of the optical component can be fixed for testing. In the present example shown in FIG. 2, the electrical interface portion 110 provides a cavity where a flexible circuit board interface from the TO can package can be routed.

The example shown in FIGS. 1 and 2 further includes two rows of pogo pin holes through which pogo style pins may be placed. While two rows of pogo pin holes 112 are shown, generally only one row of pogo pin holes is populated with pogo style pins for a given test. The rows of pogo pin holes 112 may be arranged such that different lengths of flexible circuit boards may be tested. The pogo pins used in the pogo pin holes 112 are spring loaded pins that can be used to contact the traces on the flexible circuit boards and to contact test circuitry. This allows testing to be quickly performed without the need to damage interface portions of the optical component such as may occur when electrical components are soldered.

Figure 3:
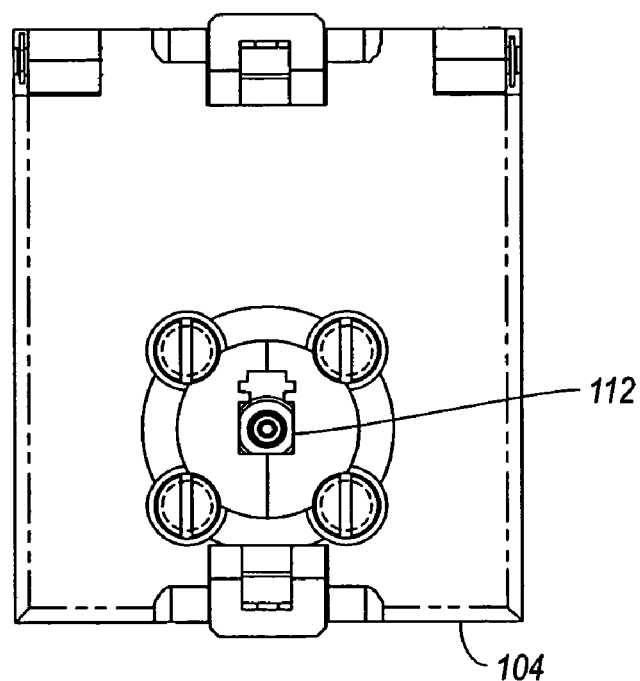
FIG. 3 illustrates a top view of the test fixture.

Referring now to FIG. 3, a top view of the lid 104 is shown. The lid 104 includes an optical fiber receptacle 112. The optical fiber receptacle 112 may be, for example, an LC, SC, or other suitable receptacle.

Referring again to FIG. 1, one embodiment includes a hinge 114 connecting the base socket 102 and the lid 104. The lid 104 can be rotated about the hinged 114. A latch 116 can be used to secure the lid 104 to the base socket 102 such that the optical component under test can be fixed in a predetermined position for testing. The test fixture 100 may include various biasing springs and support members configured to help position the optical component under test into an appropriate location.

The test fixture 100 shown herein may be fabricated from test fixtures available from Synergetix of Kansas City, Kans.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention also may be described in terms of methods comprising non-functional acts. Usually, non-functional acts describe more specific actions for achieving a particular result. Although non-functional acts may be described or claimed in a particular order, the present invention is not necessarily limited to any particular ordering or combination of acts.

What is claimed is:

1. An apparatus for testing optical components, the apparatus comprising:
   a component cavity, the component cavity comprising:
      a package portion generally including fit tolerances but otherwise including a similar size and shape of an optical component to be tested;
      an electrical interface portion configured to receive electrical interface leads of the optical component; and
      a latch mechanism configured to secure the optical component; and
   an optical fiber interface coupled to the cavity, the optical fiber interface configured to mate with an optical fiber and configured to optically couple the optical fiber to the optical component being tested; and
   one or more biasing springs and support members configured to help position the optical component to be tested into an appropriate location.

2. The apparatus of claim 1, wherein the electrical interface portion is configured to receive a flex circuit.

3. The apparatus of claim 1, further comprising pogo pins disposed at or near the electrical interface portion, the pogo pins being configured to contact electrical connections to the optical component.

4. The apparatus of claim 1, wherein the optical fiber interface comprises an LC receptacle.

5. The apparatus of claim 1, wherein the optical fiber interface comprises an SC receptacle.

6. The apparatus of claim 1, wherein the package portion is adapted to receive a TO can package.

7. The apparatus of claim 1, the apparatus comprising a base and a lid, and wherein at least a portion of the component cavity is disposed in the lid.

8. The apparatus of claim 1, the apparatus comprising a base and a lid, and wherein at least a portion of the component cavity is disposed in the base.

9. The apparatus of claim 1, the apparatus comprising a base and a lid, and wherein the base and the lid are coupled together with a hinge and selectively engageable with each other by way of the latch mechanism.

10. A method of testing optical components, the method comprising:
    placing the optical component into a package portion of a component cavity, the package portion generally including fit tolerances but otherwise including a similar size and shape of the optical component;
    placing leads coupled to the package in an electrical interface portion of the component cavity;
    securing the optical component using a latch mechanism; and
    connecting a fiber-optic cable including a connector to a receptacle mating with the connector such that the fiber-optic cable is optically coupled to the optical component.

11. The method as recited in claim 10, wherein the optical component comprises a TO can package.

12. The method as recited in claim 10, further comprising using the optical component to generate an optical signal.

13. The method as recited in claim 10, further comprising receiving an optical signal at the optical component.

14. An apparatus for testing optical components, the apparatus comprising:
    a component cavity, the component cavity comprising:
        a package portion generally including fit tolerances but otherwise including a similar size and shape of an optical component to be tested; and
        an electrical interface portion configured to receive electrical interface leads of the optical component;
    an optical fiber interface coupled to the cavity, the optical fiber interface configured to mate with an optical fiber and configured to optically couple the optical fiber to the optical component being tested; and
    one or more biasing springs and support members configured to help position the optical component to be tested into an appropriate location.

15. The apparatus as recited in claim 14, wherein the optical fiber interface comprises one of: an LC connector; or, an SC connector.

16. The apparatus as recited in claim 14, wherein the apparatus comprises a base and a lid that collectively define a clamshell configuration, at least a portion of the component cavity being defined by the lid.

17. The apparatus as recited in claim 14, further comprising a latch mechanism configured to secure the optical component, the latch mechanism comprising a pair of latches.

18. The apparatus as recited in claim 14, wherein the optical component comprises one of: an optical receiver; and, an optical transmitter.

* * * * *